(12) United States Patent
Balzer et al.

(10) Patent No.: US 10,885,225 B2
(45) Date of Patent: Jan. 5, 2021

(54) PROTECTING PERSONALLY IDENTIFIABLE INFORMATION (PII) USING TAGGING AND PERSISTENCE OF PII

(71) Applicant: Microsoft Technology Licensing, LLC, Redmond, WA (US)

(72) Inventors: Andreas Balzer, Dublin (IE); David Mowatt, Dublin (IE); Muiris Woulfe, Dublin (IE)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 96 days.

(21) Appl. No.: 16/003,739

(22) Filed: Jun. 8, 2018

(65) Prior Publication Data

US 2019/0377900 A1    Dec. 12, 2019

(51) Int. Cl.
*G06F 21/62* (2013.01)
*H04L 29/06* (2006.01)
(Continued)

(52) U.S. Cl.
CPC ........ *G06F 21/6254* (2013.01); *G06F 40/205* (2020.01); *H04L 9/0894* (2013.01); *G06F 16/93* (2019.01); *H04L 67/10* (2013.01)

(58) Field of Classification Search
CPC .. G06F 21/6254; G06F 17/2785; G06F 17/27; H04L 63/0421; G10L 25/48; G10L 2015/088; H04M 3/5175
See application file for complete search history.

(56) References Cited

U.S. PATENT DOCUMENTS 6,275,824 B1    8/2001 O'Flaherty et al.
6,397,224 B1    5/2002 Zubeldia et al.
(Continued)

OTHER PUBLICATIONS

Scannapieco, et al., "Privacy Preserving Schema and Data Matching", In Proceedings of the ACM SIGMOD International Conference on Management of Data, Jun. 11, 2007, 12 Pages.
(Continued)

*Primary Examiner* — Amir Mehrmanesh
(74) *Attorney, Agent, or Firm* — Michael Best & Friedrich LLP

(57) ABSTRACT

A system includes an electronic processor configured to store records in a client database. The records included personally identifiable information associated with entities and a client identifier reference associated with each of the individuals, the personally identifiable information is accessible based on an authorization level associated with a user. The electronic processor is also configured to receive a document containing both non-personally identifiable information and personally identifiable information, parse the document to determine the presence personally identifiable information in the document, verify the access rights of the reader of the document, match the personally identifiable information included in the document with records stored in the client database, substitute the personally identifiable information included in the document with the corresponding client identifier reference referring to the client database, and generate a human-legible view of the document containing the corresponding client identifier reference.

19 Claims, 9 Drawing Sheets

(51) Int. Cl.
*H04L 9/08* (2006.01)
*G06F 40/205* (2020.01)
*G06F 16/93* (2019.01)
*H04L 29/08* (2006.01)

(56) References Cited

U.S. PATENT DOCUMENTS

| | | | |
|---|---|---|---|
| 7,617,393 B2 | 11/2009 | Betz et al. | |
| 7,711,749 B2 | 5/2010 | Brodie et al. | |
| 9,202,085 B2 | 12/2015 | Mawdsley et al. | |
| 9,355,273 B2 | 5/2016 | Stevens et al. | |
| 9,582,680 B2 | 2/2017 | Bilodeau et al. | |
| 9,684,799 B2 | 6/2017 | Bhogal et al. | |
| 2005/0065824 A1 | 3/2005 | Kohan | |
| 2005/0132070 A1 | 6/2005 | Redlich et al. | |
| 2006/0143459 A1 | 6/2006 | Villaron et al. | |
| 2009/0049069 A1 | 2/2009 | Aggarwal et al. | |
| 2011/0239113 A1 | 9/2011 | Hung et al. | |
| 2013/0266127 A1 | 10/2013 | Schachter et al. | |
| 2014/0372401 A1* | 12/2014 | Goldstein | G06F 16/638 707/706 |
| 2015/0195406 A1 | 7/2015 | Dwyer et al. | |
| 2015/0213288 A1 | 7/2015 | Bilodeau et al. | |
| 2016/0239668 A1 | 8/2016 | Bellert | |
| 2016/0283473 A1* | 9/2016 | Heinze | G06F 16/31 |
| 2017/0061138 A1* | 3/2017 | Lambert | H04L 63/18 |
| 2017/0177798 A1* | 6/2017 | Samuel | G06F 21/6254 |
| 2017/0207916 A1* | 7/2017 | Luce | H04L 9/14 |
| 2017/0249466 A1 | 8/2017 | Ben-yair et al. | |
| 2017/0264619 A1* | 9/2017 | Narayanaswamy | H04L 63/0281 |
| 2018/0268240 A1* | 9/2018 | Loce | G06K 9/00228 |
| 2018/0309775 A1* | 10/2018 | Zou | H04L 63/1416 |
| 2019/0138748 A1* | 5/2019 | Long | G06F 21/6254 |
| 2019/0377900 A1* | 12/2019 | Balzer | H04L 9/0894 |
| 2019/0377901 A1 | 12/2019 | Balzer et al. | |

OTHER PUBLICATIONS

"International Search Report and Written Opinion Issued in PCT Application No. PCT/US19/034778", dated Sep. 4, 2019, 14 Pages.

"International Search Report and Written Opinion Issued in PCT Application No. PCT/US2019/034774", dated Jul. 23, 2019, 13 Pages.

"Non-Final Office Action Issued in U.S. Appl. No. 16/004,128", dated Feb. 21, 2020, 13 Pages.

* cited by examiner

<BODY> I spoke to Tom Smith about the case yesterday. Tom (and his daughter Maria Smith) were surprised by the announcement. </BODY>  — 802

<BODY> I spoke to [Ref ID=1321/1 Val=GivenName] [Ref ID=1321/1 Val=FamilyName] about the case yesterday. [Ref ID=1321/1 Val=GivenName] (and his daughter [Ref ID=1321/1 Val=DaughterFullName]) were surprised by the announcement. </BODY>  — 804

I spoke to Tom Smith about the case yesterday. Tom (and his daughter Maria Smith) were surprised by the announcement.  — 806

I spoke to ■ about the case yesterday. ■and his daughter ■ were surprised by the announcement.  — 808

FIG. 8

PROTECTING PERSONALLY IDENTIFIABLE INFORMATION (PII) USING TAGGING AND PERSISTENCE OF PII

FIELD

Embodiments described herein relate to protecting personally identifiable information associated with digital content.

BACKGROUND

Protection of personally identifiable information (PII) is required by governmental laws and regulations. Even when protection is not required, organizations may be motivated to protect personally identifiable information for various reasons such as fostering trust with customer/users or minimizing legal risk. The management of personally identifiable and sensitive information has become particularly critical in an increasingly collaborative and electronic world. While the management of such information in a manner to prevent unauthorized access is often primarily focused on security, an equally important effort must be done to help prevent a user from accidentally disclosing such information through the simple exchange of electronic documents. Regardless of the reason, protecting personally identifiable information is expensive in terms of resources, which ultimately translates into a financial cost to the organization.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. The sole purpose of this summary is to present some concepts of one or more implementations of the present disclosure in a simplified form as a prelude to the more detailed description that is presented later.

With the implementation of governmental regulations (for example, the General Data Protection Regulation (GDPR)), organizations need to be able to effectively retrieve and (upon request) delete content and documents containing personally identifiable information. Existing ways of handling personally identifiable information include performing an internal audit, where a client submits to an organization a request associated with the client's personally identifiable information. Typically, an individual working for the organization performs a bulk query against all client documents and then performs an analysis of each document to determine whether the document includes personally identifiable information. Redaction of personally identifiable information is performed manually. The entire process could take days, weeks, or months.

Embodiments described herein include, among other things, a software application (for example, it can be either a local standalone application, or a server-based client application), which enables users within an organization to create, save, and share documents. The expression "documents" is used to mean database records, word documents, spreadsheets, presentations, portable document format (PDF), sound files, image files, videos etc. Embodiments described herein protect personally identifiable information by leveraging the organization's software service that allow for the creation and storing of data by creating an account or subscription with the organization, using the organization's email service or productive suite (for example, a document storage suite such as Sharepoint) or at the operating system level (for example, using a cloud based user directory with access control information such as Azure Active Directory). In some embodiments, the systems and methods discussed herein enable, among other things, instantaneous tagging of named individuals while a document is being authored, and thus enable faster, and in certain instances, almost instantaneous retrieval of all documents relating to that individual. Systems and methods discussed also enable deletion requests by a client to result in the original document being redacted rather than deleted. This ensures that when a document is shared, only authorized recipients may see personally identifiable information associated with the client. Additionally, any document that is sent outside of a trust boundary may be automatically deleted or have the PII automatically deleted.

An example embodiment includes a computer system for protecting information associated with concepts (for example, topics such as discussion on a space or defense program, etc.) and/or entities including individuals, groups, organizations, etc. The computer system includes an electronic processor configured to store records in one or more client databases, wherein the records include information (for example, personally identifiable information) associated with entities such as but not limited to individuals, groups, organizations, objects, concepts, etc. and a client identifier reference is associated with a particular characteristic associated with each entity (for example, name, date of birth, place of birth, email address, phone number, fax number, particular content, social networking credential, biometric information, financial account number, organization issued identification, government issued identification, etc.). The personally identifiable information is accessible based on an authorization level associated with a user. The electronic processor is also configured to receive a document containing both non-personally identifiable information and personally identifiable information, and parse the document to determine the presence of personally identifiable information in the document. The electronic processor is also configured to match the personally identifiable information included in the document with records stored in the one or more client databases, substitute the personally identifiable information included in the document with the corresponding client identifier reference stored in the client database, and generate a human-legible view of the document containing the corresponding client identifier reference. In some embodiments, the system may use machine learning to reword client identifier references to fit into the sentence structure. For example, the German language has specific words to refer to a female person versus a male person. Saying "eine [client identifier reference]" immediately identifies the person as being female. The system 100 may instead automatically redact "eine" from the document in order to not disclose the gender of the person.

Another example embodiment includes a computer system for protecting personally identifiable information (PII). The computer system includes an electronic processor configured to store a cryptographic key associated with a user having access to personally identifiable information within the document. The electronic processor is also configured to receive the document containing unencrypted non-personally identifiable information and encrypted personally identifiable information. The electronic processor is also configured to parse the document to determine the presence of personally identifiable information and detect an encrypted portion in the document. The electronic processor is also configured to retrieve the personally identifiable information based on decrypting the encrypted portion using the cryptographic key. The electronic processor is also configured to display a human-legible view of the document.

Another example embodiment includes a method for protecting personally identifiable information of individuals. The method includes storing records in a client database. The records include personally identifiable information associated with individuals and a client identifier reference associated with each of the individuals. The personally identifiable information is accessible based on an authorization level associated with a user or a group to which a particular user belongs. The method also includes receiving a document containing both non-personally identifiable information and personally identifiable information of one or more individuals, and parsing the document to determine the presence of personally identifiable information included in the document. The method also includes matching the personally identifiable information included in the document with records stored in the client database. The method also further includes substituting the personally identifiable information included in the document with the corresponding client identifier reference stored in the client database, and generating a human-legible view of the document containing the corresponding client identifier reference.

Another example embodiment includes a non-transitory computer-readable medium containing instructions that when executed by one or more electronic processors cause the one or more electronic processors to perform the set of actions including storing records in a client database, wherein the records include personally identifiable information associated with individuals and a client identifier reference associated with each of the individuals, and the personally identifiable information is accessible based on an authorization level associated with a user, receiving a document containing both non-personally identifiable information and personally identifiable information, parsing the document to determine the presence of personally identifiable information in the document, matching the personally identifiable information included in the document with records stored in the client database, substituting the personally identifiable information included in the document with the corresponding client identifier reference stored in the client database, and generating a human-legible view of the document containing the corresponding client identifier reference.

By the use of the techniques disclosed herein, one or more devices can be configured to, among other things, conserve resources with respect to power resources, memory resources, communications bandwidth resources, processing resources, and/or other resources while providing mechanisms for controlling and deleting personally identifiable information in a document. Technical effects other than those mentioned herein can also be realized from an implementation of the technologies disclosed herein.

BRIEF DESCRIPTION OF THE DRAWINGS

The present disclosure will be better understood from the following detailed description read in light of the accompanying drawings, wherein like reference numerals are used to designate like parts in the accompanying description.

FIG. 8 shows an example text that is scrubbed to remove PII, in accordance with some embodiments.

DETAILED DESCRIPTION

Embodiments of systems and methods for protecting personally identifiable information (PII) are described herein. The personally identifiable information protecting system is configured to detect and remove personally identifiable information within documents based on authorization level based rules provided to the system.

When electronic documents are created and edited using software applications (for example, using productivity tools such as word processing applications or email applications), various forms of data (for example, personally identifiable information) are often created in the form of content in the documents or in the form of metadata. Controlling access to subsequent users and recipients of documents can protect personally identifiable information of individuals and ensures privacy for the users. As used herein, personally identifiable information (PII) includes anything that particularly identifies a particular entity (for example, a user, organization or content, etc.). This can mean any data collected about the users or provided by them unless they have explicitly authorized the organization to share that information. Some common examples of personally identifiable information include name, date of birth, biometric information, government issued identification number (for example, social security number (SSN), driver's license number, etc.), financial account information (for example, bank account number, credit card number, etc.), personal phone number, and mailing address. Other data that may be considered PII includes Internet protocol (IP) address, company name, and location information. PII may also be incorporated in free form data, for example document names, email headers, or any other data taken in aggregate that can be used to determine details about an entity (for example, a user, organization, or particular content). In some embodiments, the system is configured to leave some PII data in the document initially but then be able to remove all the PII data once a threshold of number of items is passed. Each of the items may have different weightings associated with them. For example, when just a first name is used and no other information is used—the first name may be retained in a document. However, when a date of birth associated with the first name is provided in the document making it easier for a reader to determine the identity of the individual, the system will remove all the data related to the PII of the individual.

Figure 1:
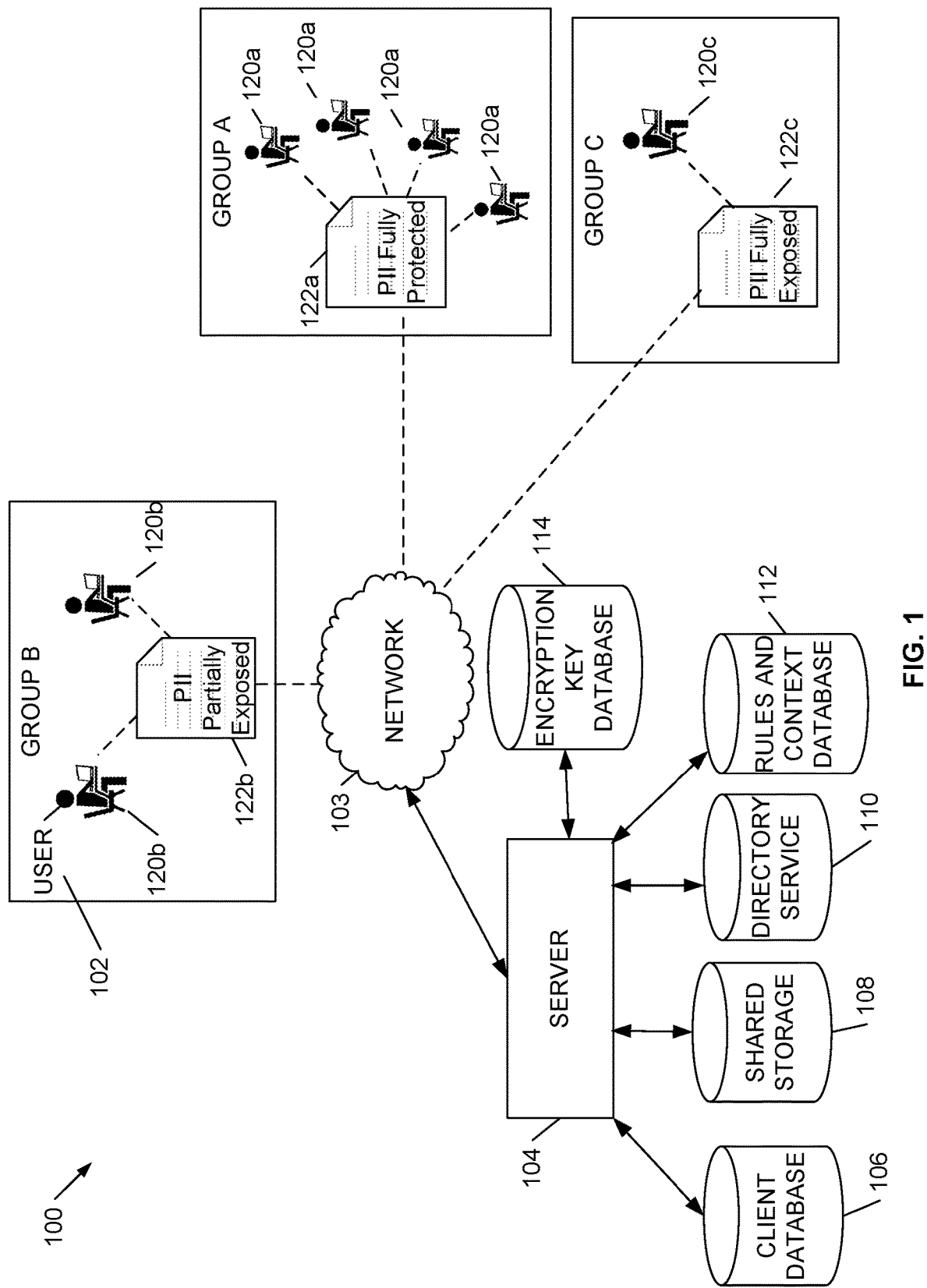
FIG. 1 illustrates an example of a personally identifiable information protecting system.

FIG. 1 illustrates an example of a personally identifiable information protecting system 100. In the example illustrated, the system 100 includes client devices 120*a*, 120*b*, 120*c* that accesses a server 104 via a network 103. The server 104 is connected to a client database 106, shared storage 108, directory service 110 (for example, a database or an application that provides documents along with an associated level of authorization to view personally identifiable information in the documents), rules and context database 112, and an encryption key database 114. The directory services 110 provides a data structure to manage several categories of users 102 including management of access credentials for the individual users 102 to view personally identifiable information. The system 100 may operate locally or in a distributed environment, such as in client-server or cloud services architectures. Any distributed components of the system 100 may communicate with each other or be accessed over at least one computer network, such as, but not limited to, the Internet, an intranet, a local area network, or a wide area network.

The term "clients," "consumers," "customers," or "subscribers" can be used interchangeably herein to refer to the users 102 using services provided using system 100. One or more users 102 can subscribe to, or otherwise register for, access to one or more software application(s) as a "user" of the software application(s). In some embodiments, a user can include an individual user 102 or a group of multiple users (for example, User Group A, User Group B or User Group C shown in FIG. 1). User Group A may include a group of users who may access, view, or create documents where the personally identifiable information is fully protected. User Group B may include a group of users who may access, view, or create documents where some of the personally identifiable information is protected and other personally identifiable information may be exposed. User Group C may include a group of users who may access, view or create documents where the personally identifiable information is fully exposed.

The client computing devices 120 (sometimes referred to herein as "client devices 120") can be implemented as any number of computing devices, including, without limitation, a personal computer, a laptop computer, a desktop computer, a portable communication device (for example, a mobile phone or a tablet), or other electronic device that can transmit and/or receive data over a network 103. The network(s) 103 is representative of many different types of networks, and includes wired and/or wireless networks that enable communications between the various entities in the system 100. In some configurations, the network(s) 103 can include the Internet, local area networks (LANs), wide area networks (WANs), a mobile telephone networks (MTNs), and other types of networks, possibly used in conjunction with one another, to facilitate communication between the server 104 and the client devices 120. Although some configurations are described in the context of a web-based system, other types of client/server-based communications and associated application logic could be used.

Figure 2:
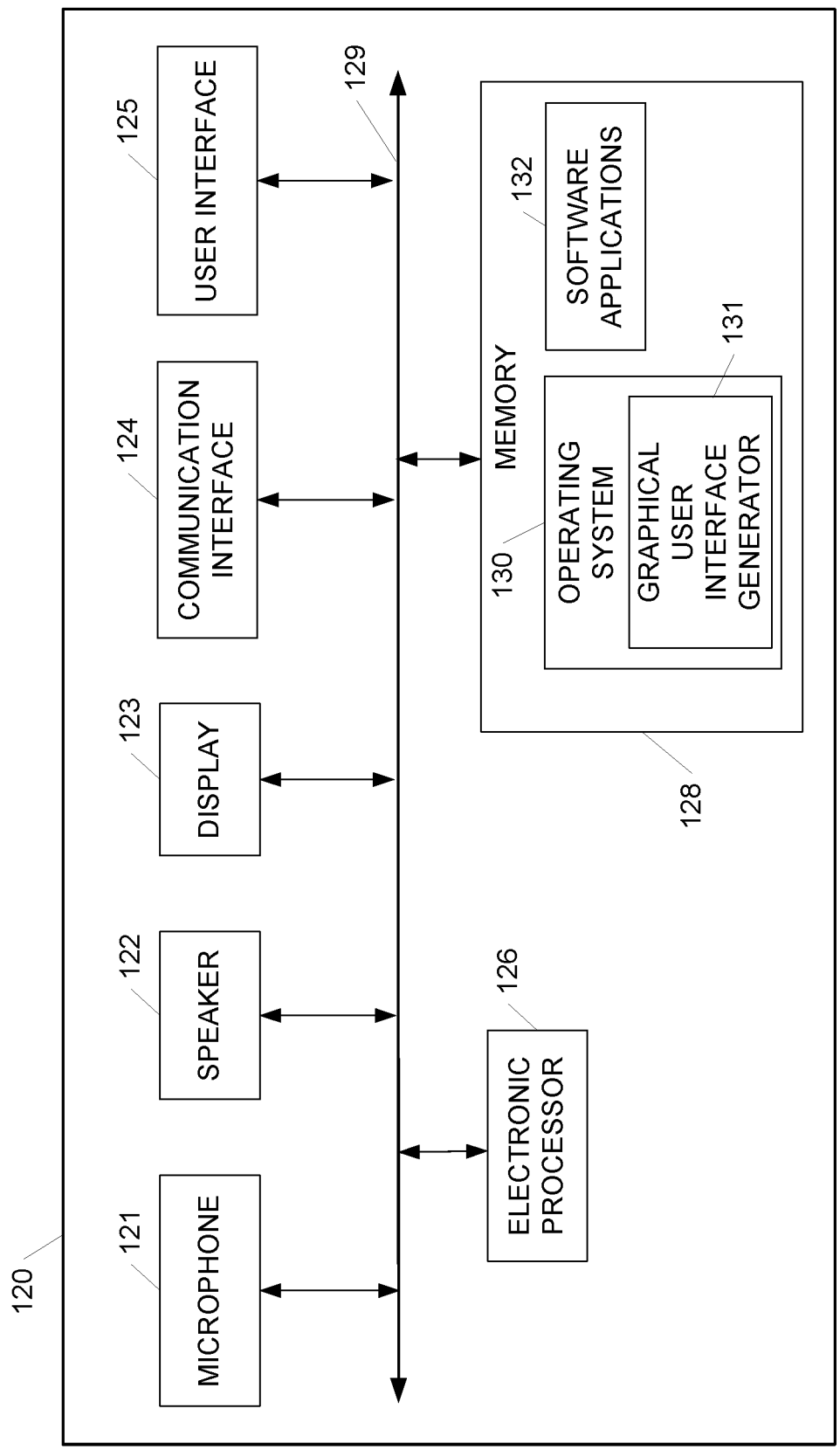
FIG. 2 is a block diagram of an example computing device shown in FIG. 1.

FIG. 2 is an example block diagram of a computing device 120 shown in FIG. 1. The computing device 120 includes a microphone 121, a speaker 122, a display 123, a communication interface 124, a user interface 125, an electronic processor 126, and a memory 128 coupled to a data bus 129.

The communication interface 124 provides the computing device 120 a communication gateway with an external network (for example, a wireless network, the Internet, etc.). The communication interface 124 may include, for example, an Ethernet card or adapter or a wireless local area network (WLAN) card or adapter (for example, IEEE standard 802.11a/b/g/n). The communication interface 124 may include address, control, and/or data connections to enable appropriate communications on the external network.

The user interface 125 provides an input mechanism such as a keyboard that may be a physical keyboard or a "soft" keyboard generated on a touch screen display. The user interface 125 is configured to receive user input to access and interact with one or more software applications stored in memory 128.

The electronic processor 126 may include at least one processor or microprocessor that interprets and executes a set of instructions stored in the memory 128. The memory 128 includes an operating system 130 and software applications 132. In the example shown, the operating system 130 includes a graphical user interface generator 131 that creates a graphical user interface on the display 123. The software programs 132 are configured to, among other things, implement the methods described herein. The memory 128 includes volatile memory elements (for example, random access memory (RAM)), nonvolatile memory elements (for example, ROM), and combinations thereof. In some embodiments, the memory 128 has a distributed architecture, where various components are situated remotely from one another, but may be accessed by the electronic processor 126.

The data bus 129, or other component interconnection, permits communication among the components of the computing device 120. The data bus 129 may have additional elements, which are omitted for simplicity, such as controllers, buffers (for example, caches), drivers, repeaters and receivers, or other similar components, to enable communications. The data bus 129 may also include address, control, data connections, or a combination of the foregoing to enable appropriate communications among the aforementioned components. In some embodiments, the electronic processor 126 is configured to encrypt data associated with PII and store the encrypted data in memory 128.

Figure 3:
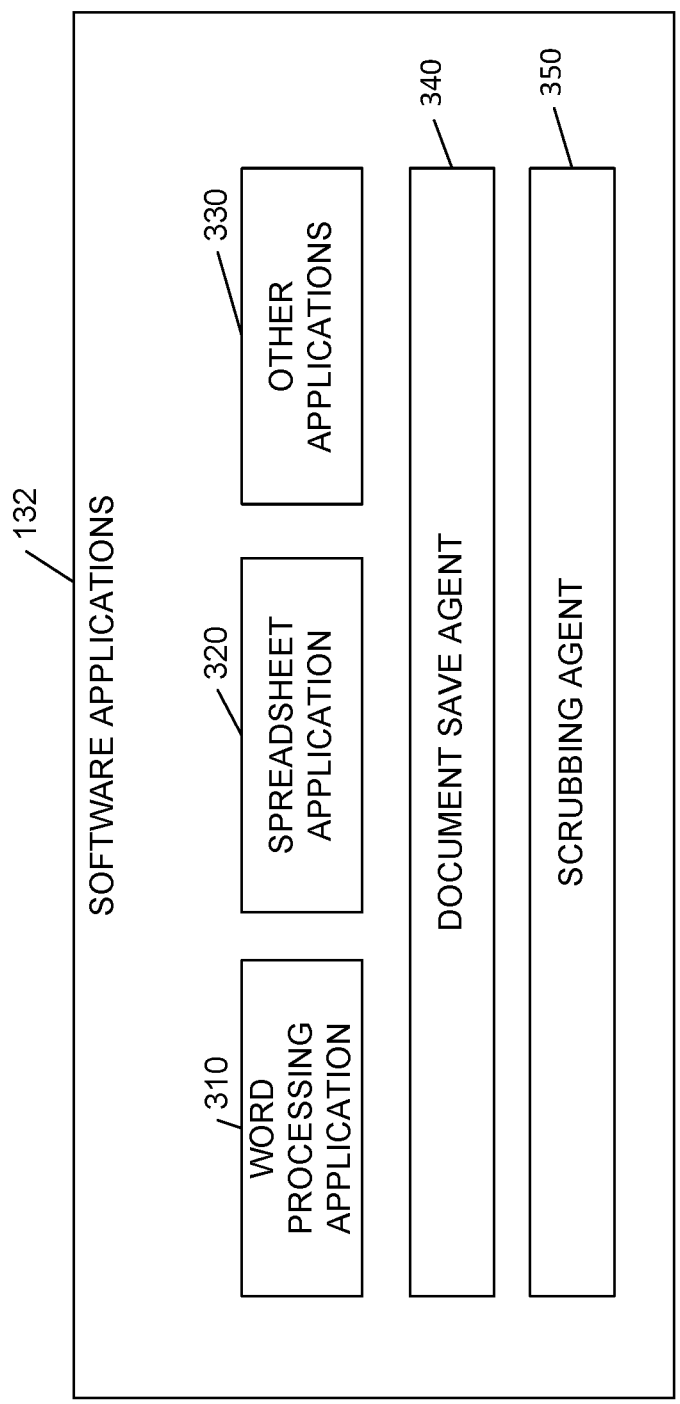
FIG. 3 is a block diagram showing several software programs stored in memory of computing device shown in FIG. 2, in accordance with some embodiments.

FIG. 3 is a block diagram showing several software applications 132 stored in memory of computing device shown in FIG. 2, in accordance with some embodiments. In some embodiments, software applications 132 include as word processing application 310, a spreadsheet application 320, and other applications 330. The software applications further include a saving agent 340 and a scrubbing agent 350. The document save agent 340 and the scrubbing agent 350 are executed using the electronic processor 126 in the computing device 120. In one embodiment, the document save agent 310 is responsible for providing a client access and ability to save documents using the system 100. In some embodiments, the document save agent 310 also saves logs associated with client's successful (or failed) events while accessing documents. In some embodiments, the directory service 110 is responsible for providing a client with appropriate access to components of system 100.

In some embodiments, the document save agent 310 processes data that contain personally identifiable information collected from users 102 as part of the data routinely logged for business purposes. Examples of types of data that may be saved include, but are not limited to, collection of words, formatting, any embedded imagery, charts within a document, security related events (for example, login attempts and authorization of users), input/output events (for example, network or file system transactions including viewing, editing and saving files), etc.

The scrubbing agent 350 processes the saved data based on rules stored in the rules database 112. The scrubbing agent 350 may be a standalone application or an integral component of another application. Although illustrated and described as being executed in a single computing device, the document save agent 310 and the scrubbing agent 350 may be distributed and/or executed across many computing devices. In some embodiments, the scrubbing agent 350 and/or the scrubbing application 320 includes different engines that perform different types of actions on documents. In various embodiments, the scrubbing agent 350 and/or the scrubbing application 320 includes a parsing engine (for example, to identify possible PII), and a processing engine (for example, to use rules from the data base 112 to convert plain text stored PII into a reference). The parsing engine performs processing actions responsible for tasks such as, but not limited to, parsing fields within a document containing personally identifiable information or forwarding the identified field to a child parser which can break the field into smaller components (for example, subfields or name/value pairs). In some embodiments, a filtering engine is provided that performs filtering actions that determine whether a field within a document needs to be processed (for example, to determine whether an audio or video component in a document needs to be processed).

The word processing application 330 provides a platform for the user 102 to compose, edit, format, and print documents, including documents that contain personally identifiable information. In some embodiments, the word processing application 330 includes an extension or a feature that allows the word processing application 330 to access the client database 106 to retrieve client identifier references associated with personally identifiable information within documents accessed by user 102. In some embodiments, the system 100 is designed to identify likely PII (for example, identifying common names of an individual or organization). In some embodiments, when network connectivity is not available or in an architecture where no central database 106 is available, the personally identifiable information in a document may be encrypted and saved along with the document instead of storing the encrypted personally identifiable information in a centralized client database.

Figure 4:
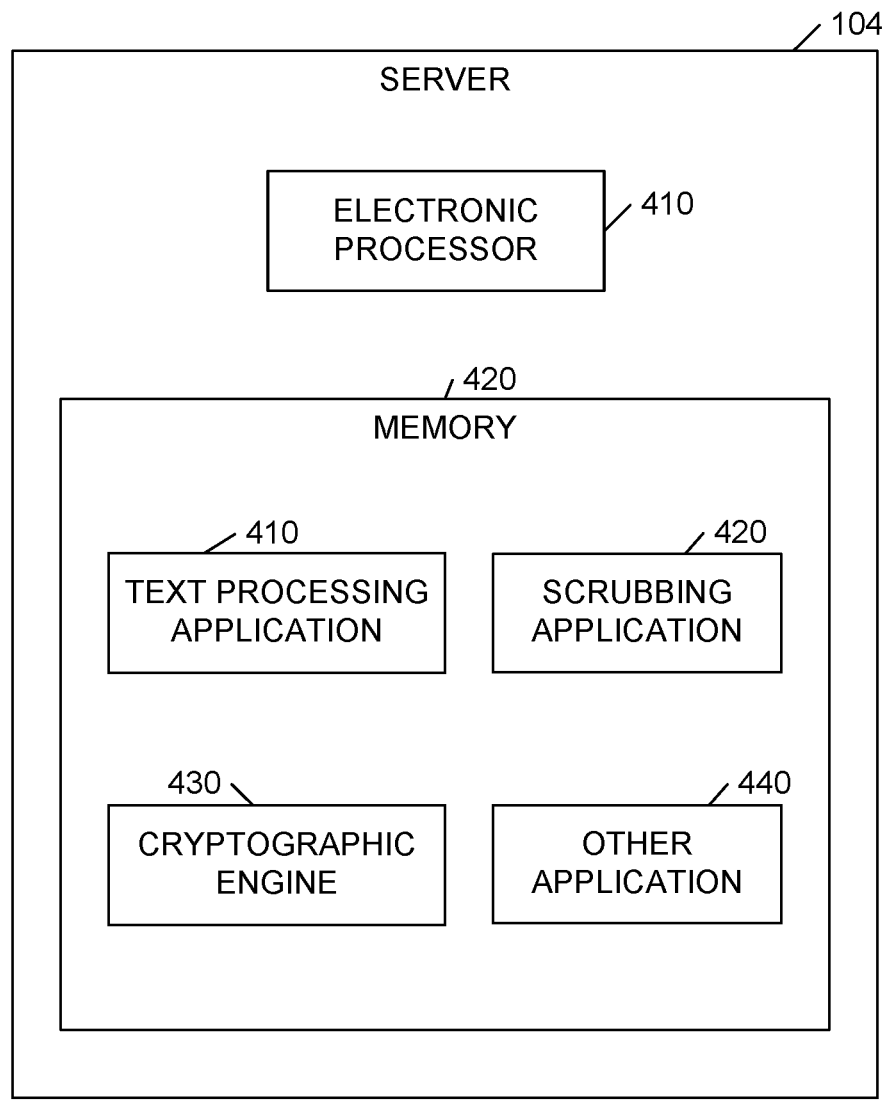
FIG. 4 is a block diagram of the server shown in FIG. 1, in accordance with some embodiments.

FIG. 4 is a block diagram of the server 104 shown in FIG. 1, in accordance with some embodiments. The server 104 includes an electronic processor 410 and a memory 420 including one or more software application(s). The computing device 120 accesses software application(s) in memory 420 of server 104 through the network 103. The software application(s) can include, without limitation, an image and video processing application 430, an audio processing application 440, a text processing application 450, a scrubbing application 420, and other programs 470. In some embodiments, the image and video processing application 430 includes software programs capable of processing still or video images and determining whether images that include personally identifiable information associated with a client are present in a document.

In some embodiments, the text processing application 450 includes software programs capable of processing textual data and determining whether any textual information that includes personally identifiable information associated with a client is present within a document. In some embodiments, the scrubbing application 420 locates and replaces personally identifiable information in documents using the rules and context information stored in rules and context database 112. In some embodiments, the scrubbing application 420 is a distinct application in itself capable of opening a document file and enabling a user to work through the document contents to scrub information (for example, PII) within the document by locating and replacing particular text. When the parsing process within the scrubbing application 420 identifies PII, a post-processing operation to prepare the message for storage in a data store (for example, shared storage 108) is performed. In some embodiments, the post-processing operation includes an annotation operation that annotates the document with additional information that is needed to properly interpret the data in the document when the document is added to a data store (for example, in the case of documents that have not been scrubbed before). In some embodiments, when documents are received by an application that does not have an annotation operation, the application uses the previous annotation (for example, stored in a database/memory) and applies it to these documents.

In some embodiments, the client identifier includes a plurality of segments to indicate several pieces of information. For example, a first segment may be associated with an individual and a second segment that may be associated with an organization. A third segment that may be associated with a group or company (having some sort of hierarchy), or a forth segment that may be associated with a client database lookup system (for example, checking passport numbers).

Figure 5:
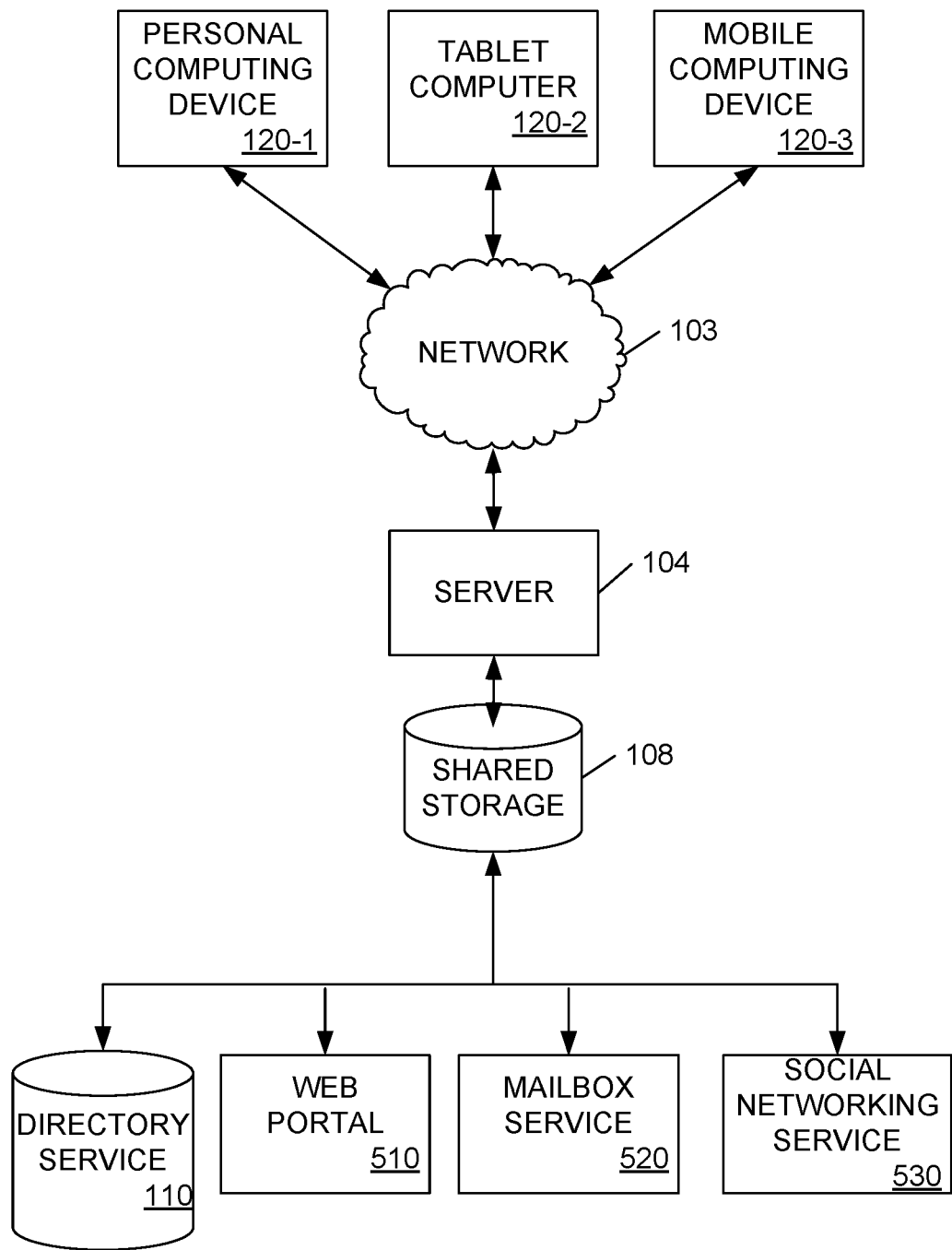
FIG. 5 is a block diagram of a distributed computing system in which embodiments provided herein may be practiced.

Other information that may be added to the document includes information such as the document source (for example, a server identifier). In some embodiments, a protected record storage operation is performed that sends the scrubbed document with the PII in a protected format to a data repository (for example, shared storage 108). Once in the data repository, the scrubbed documents are available for use by various consumers of the data FIG. 5 is a block diagram of a distributed computing system in which embodiments provided herein may be practiced. Content developed, interacted with, or edited in association with the software applications 132 may be stored and retrieved from different servers, communication channels, or other storage types. For example, various documents may be stored using a directory service 110, a web portal 510, a mailbox service 520, or a social networking service 530. The software applications 132 may use any of these types of systems or the like for enabling data utilization, as described herein. The server 104 may also provide software applications 132 over the web to clients through the network 103. By way of example, the client computing device may be implemented as the computing device 120 and embodied in a personal computing device 120-1, a tablet computer 120-2, and/or a mobile computing device (for example, a smart phone) 120-3. Any of these embodiments of the client device may obtain content from the shared storage 108.

Figure 6:
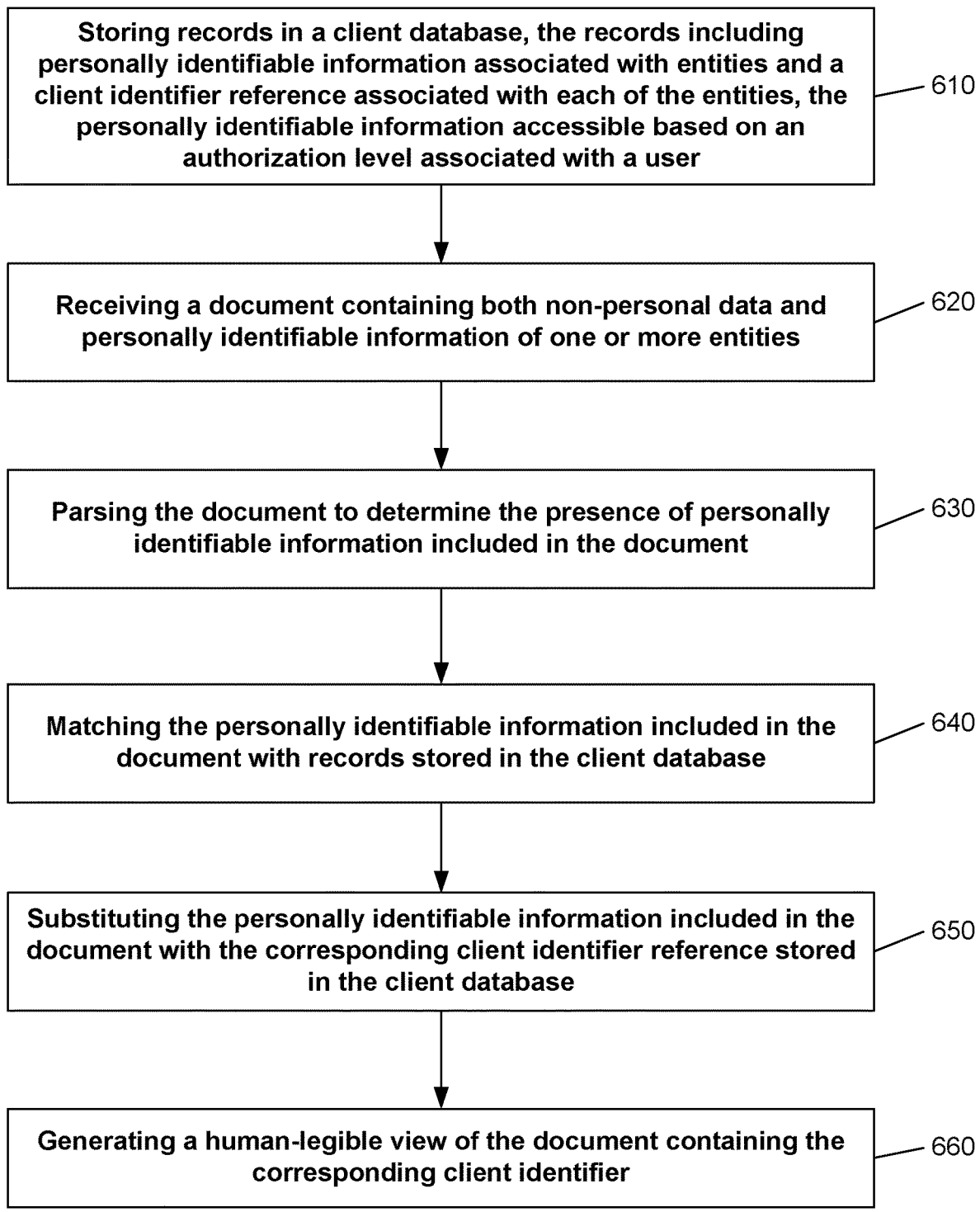
FIG. 6 and FIG. 7 are flow charts illustrating methods for protecting personally identifiable information, in accordance with some embodiments.
Figure 7:
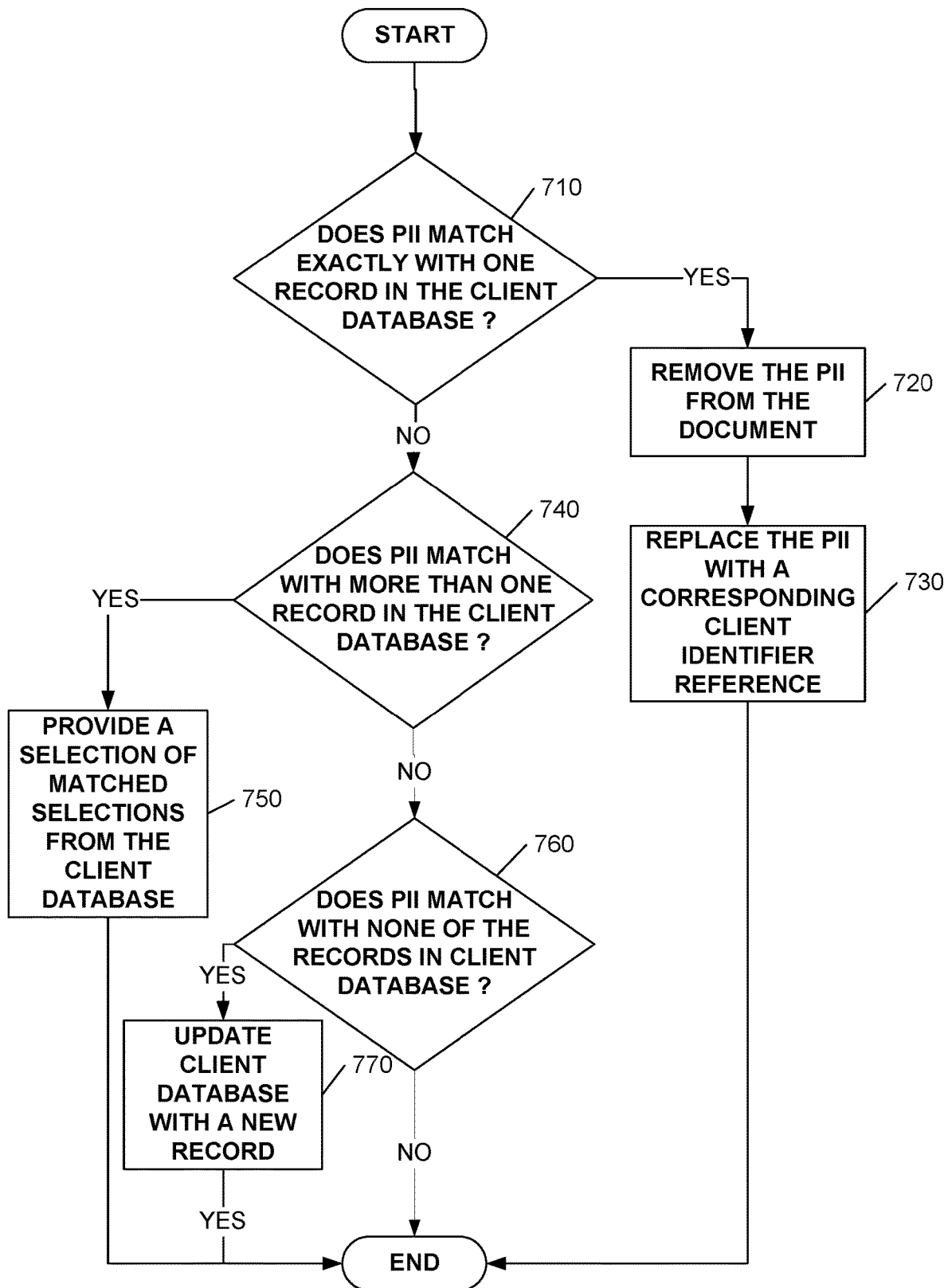

FIG. 6 and FIG. 7 are flow charts illustrating a method for protecting personally identifiable information, in accordance with some embodiments. At block 610, the electronic processor 410 in server 104 stores records (for example, personally identifiable information associated with individuals and client identifiers) in the client database 106. Each record in the client database 106 contains a name or other information (for example that identifies an entity (for example, an individual, a group or an organization, etc.), but may also contain one or more of client's title, first, middle and last names as well as nicknames/abbreviations. Additional information may be stored to help the system and the organization disambiguate that individual versus others. This may include email address, home address, phone numbers, names of organizations they own or are employed by, individuals in the organization they worked with (for example, particular teachers, doctors), names of children. The scenarios are provided here only as examples and can vary depending on the nature of the organization that stores data about clients.

At block 620, the electronic processor 410 receives, from a shared storage 108, a document containing both non-personally identifiable information and personally identifiable information of one or more individuals. At block 630, the electronic processor 410 parses the document to determine the presence of personally identifiable information included in the document. In some embodiments, parsing the document includes analyzing strings of text in the document and converting the text into logical syntactic components that may be used to determine the presence of personally identifiable information.

At block 640, the electronic processor 410 matches the personally identifiable information with records stored in the client database 106. In some embodiments, the electronic processor 410 compares various portions of the document (for example, words, sentences, lines, etc.) with entries in the client database 106 to verify whether those portions include any personally identifiable information. In some embodiments, the electronic processor 410 determines whether personally identifiable information in the document matches exactly with one record (at block 710). When the personally identifiable information matches exactly with one record, the personally identifiable information is removed (at block 720) from the document and replaced (at block 730) with a corresponding client identifier. In some embodiments, the electronic processor 410 determines (at block 740) whether the personally identifiable information matches with more than one record in the client database 106. When the personally identifiable information matches with more than one record in the client database 106, the system 100 prompts (at block 750) the user 102 with a prioritized list of potential candidates. In this instance, the user 102 chooses the most appropriate match based on reviewing the matched selections from the client database 106 displayed to the user 102. In some embodiments, the system 100 uses collocated information (for example, a date of birth) to automatically infer the user. In other embodiments, the system 100 makes a best guess if it doesn't need to be strictly accurate. In some embodiments, the electronic processor 410 determines whether the personally identifiable information matches with none of the records in the client database 106. In this case, the client database 106 is updated using the personally identifiable information that did not previously have a corresponding match. In some instances, a new way of personally identifying an individual or entity may also be added to the client's database 106. In some embodiments, when the PII and/or individual or entity is recognized, the author may be prompted to provide more information about that individual or entity to confirm what type of PII has been discovered.

At block 640, the electronic processor 410 substitutes the personally identifiable information included in the document with the corresponding client identifier stored in the client database 106. At block 660, the electronic processor 410 generates a human-legible view of the document containing the corresponding client identifier.

In some embodiments, when a user 102 (for example, John Smith having an email identifier as "john.smith@contoso.com") uses an organization's email service and/or productivity tools to retrieve or delete information stored about them, various software tools associated with the email service and/or the productivity tools may be used to retrieve all records having a user identifier as "john.smith@contoso.com". However, there are many cases where information is stored in a harder to retrieve manner. For example, if an employee of a governmental institution (for example, healthcare, law enforcement, or education) is writing about a particular person, then the author of the document is not the same as that referenced person. Furthermore, in certain scenarios, the document may mention multiple people, for example, a commercial institution such as a bank may cite various individual customers' actions and/or histories as a need to change internal policy, or a sales teams may have marketing documents with "customer evidence" citing various customers. In some embodiments, the document includes nicknames (for example, Dave/David), or uses only the first names etc. and this may lead to confusion because multiple individuals may have the same name. As a result, when a customer asks for instant retrieval and deletion of all documents held about them, the request may require further determination of the appropriate individual. In some embodiments, characteristics associated with the document (for example, the time when the document was created, edited or deleted) may be used to determine the identity of the appropriate individual among the multiple choices available in the system.

Some embodiments provided herein use the client database 106 to enumerate a full list of clients (for example, users, individuals, customers, businesses, etc.), which may be referenced in documents. Each record refers to an individual client. In one embodiment, the record may facilitate online interaction and thus contain a username (which may be an email address) and some form of password (for example, typed characters, phone-based authentication, fingerprint, etc.). Other implementations may target scenarios where a client meets an agent of the organization (for example, a clerk at a bank counter) and thus the clerk can present physical proof (for example, government ID) for their identity to be confirmed to the agent.

In some embodiments, when an author of a document desires to mention a client, they may use an explicit "client selector" to pull up the client's name from the database and insert into the document. More frequently, however, the user 102 may simply type the client's name into the document in a sentence. With this implicit entry of a client's name, the software would use a background process to detect that someone's name has been entered. This can be achieved by looking for every word the user 102 types in a client database. In the case of Latin alphabets, capitalization is a compelling reason that a proper noun has been entered into the document. Other signals may be used such as title (for example, "Mr." or "Mrs." or "Dr."), common names, or preceding words such as "Name:" or that the author has typed something into a field, which is known to the system as frequently containing client names (for example, "CUSTOMER" or "PATIENT"). Those skilled in the art know that there are many established methods in computational linguistics and computer science to detect names within documents.

In some embodiments, the electronic processor 410 is configured to provide implicit client recognition by prompting the user 102 to confirm the identity with that name or other identifying information in the document (for example, an address). In some instances, this may not be true. For such cases, the author is provided with a prompt to explicitly select from a set of potential matches as to which individual is being envisioned by the author. In some embodiments, the potential matches are ranked based on relevance to the user. In other instances, all potential matches of individuals may be stored and not be displayed to the user if, for instance, it is determined that the author has a low level of access rights. Additionally, when the document is being deleted, one would have to ask for each potential match as to whether the user referred was the actual user in those cases. In some embodiments, there may be additional data recorded about users in the database between when the document was entered into the system and when it was deleted. In this case, the system 100 is configured to decide on the identity of the individual based on information in the document. In some embodiments, the time of deletion of documents may be used to determine the identity of the individual envisioned by the user. In some embodiments, when there are two potential matches of individuals of which one had already asked for all their data to be deleted from the system, the system can determine the identity of the individual based on this information.

In some instances, for data protection reasons, the author may not immediately have access to see the named individuals. For example, the author may type "Mary Brown" and they actually mean "Mary Jane Brown." However, there may be two records ("Mary Jane Brown" and "Mary Hanna Brown") in the client database. Thus, when the author wants to refer to the existence of "Mary Jane Brown" they may have to ask approval (for example, from a manager or an internal governance body) to write documents about "Mary Jane Brown" before their document may be saved, shared, published (for example, staging environments to test functionality, generating newspaper articles and then sending to a production/publishing environment where others can see the information), captured (for example, using a screen shot), printed, or emailed etc.

In other instances, the author may be writing about a client who is not yet recorded in the client database and thus may need to create this record. This could also trigger other workflows such as approval that a new client may be created, or a notification to the client, etc.

In some embodiments, a document is tagged as containing potential names. Documents so tagged may be subject to further manual or automated review. For example, the word "Sam" could refer to a named individual or Samantha or the Singapore Art Museum. Since many name analysis techniques have algorithms which assign a probabilistic likelihood to a given entity being a name or not, those skilled in the art will recognize that the list of documents for reviews will be given assigned ranks. Other techniques can be employed to detect that a particular document template when completed will always contain a reference to a client, but no client is yet identified in the document. Additionally, very often in documents, a full reference to an entity is given initially, and subsequent references to the entity are made using a more abbreviated reference, for example, just the title along with the last name (for example, Ms. Brown); or in less formal documents, the given name (for example, Mary). Thus, the most common scenario is one where the documents have multiple references to at least one individual. In such cases, further references are often made to that individual's activities using pronouns (for example, the use of "he", or "she") or abstract representations (for example "this patient"). In some instances redaction of "he" or "she" may be skipped. For example, in environments where everyone is male such as military documents from 75 years ago, redacting of "he" could be skipped. In some embodiments, if "he" and "she" are strewn throughout the document, it can be challenging to infer which individual a pronoun refers to. In that case, the scrubbing application 420 can use knowledge about the grammar of a user-specified language, or inferred from the document content, to parse a sentence and determine the entity (for example, an individual, a topic, a group, an organization, etc.).

Through the above processes, the software executed by the electronic processor 410 determines that the document contains certain named clients at certain points in the document. Once the author is ready to save or share the document, the software executed by the electronic processor 410 allows the author to review client references. In some embodiments, a document template contains metadata to indicate that for a document type the author must perform a review (whereas for other document types, the review may not be mandatory).

In some embodiments, when documents having a client name stored as text are saved, the electronic processor 410 augments the client name using a tag. For example, a tag may be placed around the text (for example, "The patient <CLIENT ID=12381289>Mary Brown</CLIENT> presented herself to me"). This would record in the document that a particular strongly identified client has been mentioned. In some embodiments, the document is stripped of all personally identifiable information and only references are left. For example, the document may contain, "The patient <CLIENT ID=12381289 TEXT=FIRST_NAME/> <CLIENT ID=12381289 TEXT=LAST_NAME/> presented herself to me." In such an implementation, the personally identifiable information lives within a centralized service in that organization, rather than being stored as plain text. The electronic processor 410 performs further processing to render the document. It can call to retrieve the fields of "first name" and "last name" for that client. To achieve this, authentication and authorization is used. In some embodiments, the electronic identity of the employee is confirmed using a directory service (for example, Microsoft Azure Active Directory). When the identity of the client is confirmed, the identity and the requested list of personally identifiable information is passed to an intermediary service (for example, the PII retrieval service), which determines if that employee has rights to access the requested client's personally identifiable information.

In some instances, all employees in an organization may access all clients' personally identifiable information. In other instances, access may be more granular and different view/edits rights may be assigned (or blocked) even within the organization. For example, when the electronic processor 410 receives a request that Bob York@contoso.com wishes to access <CLIENT ID=12381289 TEXT=FIRST_Name> and <CLIENT ID=12381289 TEXT=LAST_NAME/>, and the PII retrieval service may confirm that Bob has view privileges to Mary's data, and thus "Mary" and/or "Brown" are retrieved by the software depending on whether the user has access to first name only, last name only or both first name and last name. At this point, the electronic processor 410 converts the tags back into text to enable it to render "The patient Mary Brown presented herself to me." When a different employee Joe Schmidt tries to view the same document, he may see the same document but with blacked out (redacted) portions.

In some embodiments, when an author of an original document indicates that a portion of text include personally identifiable information (for example, a text such as "Since the client I am representing lives in a house neighboring FabrikamSoft's managing director and . . . ") but of a type that is not part of the regular fields in the client database, then an additional data store may be used or the this new data may be written into the client's database as part of a new field. A record can be created for the selected personally identifiable information (for example, "neighboring FabrikamSoft's managing director" and this may be given a new identifier such as GUID=18923101218209812). Alternatively, the identifier could be the document ID and a personally identifiable information instance ID, etc. Thus, the document may ultimately contain "Since the client I'm representing lives in a house <CLIENT ID=78910121 ADHOCTEXTIP=18923101218209812> and . . . ". Similarly, many different implementations and choices of where to store the data are possible.

In some embodiments, the client may use a cryptographic key associated with the client, and all of the text encrypted and stored within the document itself rather than being stored in a centralized data store. In operation, when the user's client application (for managing PII embedded in documents) is first opened, it detects that there is no key stored locally and sends a request to the encryption key database 114 for local encryption keys. The server 104 sends back all keys the client is entitled to use, according to the user's authorization level. The same process is performed once the client detects that a key has expired (although in this case only a single key would need to be fetched), determined using metadata stored as part of the key, by querying the encryption key database 114 for the expiry date and recording these details locally, or by similar methods.

In some embodiments, the user's client application may also have initial keys embedded in the application. This allows a user to start the application without having a network for requesting the keys. In some embodiments, the server delivering the client application prepares the application for a specific user, in which case the user would receive the keys to which they are entitled.

When offline, the client application can use the retained encryption key for encrypting and decrypting metadata in documents. The metadata may contain information about the keys required for decryption, either directly in the document or via metadata provided by an online service comprising a table mapping identifiers to encryption keys. In either case, when the user does not have a required key, the information will appear redacted to the user.

While online, the client application may continue to use the retained keys, or it can request new keys from the encryption key database 114. Performance gains can be realized by using the retained keys, and new keys can be asynchronously requested as a background task to ensure keys stay up to date. In some embodiments, it is also possible to revert to performing decryption on the server 104 (or some other endpoint) while operating in the online mode.

When the encryption keys are leaked (deliberately or inadvertently), it will cause a security incident as PII can be decrypted. In this case, the client application would be delivered new keys to replace the old affected keys when it next connects to the database. These would be marked as a priority, so that the client application would immediately use the old keys to decrypt all documents containing PII encrypted with those old keys before then using the new keys to re-encrypt the data. At this point, the old keys would be deleted. This task would also be performed during a normal, scheduled key rotation, which could be performed in case a key was leaked but this was not detected.

In the above described scenario, other clients sending documents encrypted with the old key cannot be read by those clients that have deleted their copy of the old key. To enable more seamless operation, the client may retain old invalidated keys for a fixed period of, say, 30 days. In some embodiments, a policy of requiring clients to connect to the database at regular, defined intervals may be established to ensure new keys are retrieved at regular intervals. This allows compromised keys to be quickly rotated out of all client applications. In some embodiments, the expiry date of keys may be set to a shorter duration than is typical so that keys are changed regularly and the impact of any unknown leaks are mitigated. This alleviates the problems associated with distributing keys to multiple entities that may not be as easy to keep secure as a centralized system (or one distributed to only a small number of endpoints).

In some embodiments, the document may be viewed by other software applications, which may have limited compatibility with the personally identifiable information retrieval service. Such applications may render only the document's plain text but may not be able to call the personally identifiable information retrieval service and thus unable to show or decrypt the personally identifiable information. In some embodiments, when a document is sent outside of the organizational boundary (for example, from one attorney's office to another attorney's office), the receiving attorney may not have sign-in access to be able to access the clients database used to create the reference. As such, they see the redacted text. In other examples, the receiving attorney may be able to request access from the sending attorney. In some embodiments, this may be granted by creating a new user identity in the directory service and associating the relevant client records with that user identify and sharing the new user identity with the receiving attorney.

In some embodiments, personally identifiable information that has been scrubbed can be shown on a dashboard that lets a user 102 view or delete documents that reference the user or other clients. FIG. 8 shows an example of text in an original document that is scrubbed to remove PII, in accordance with some embodiments. The document is sent by John Wash (attorney) to Hilda Higgins (attorney). The original document includes the following text (shown in block 802):

<BODY>I spoke to Tom Smith about the case yesterday. Tom (and his daughter Maria Smith) were surprised by the announcement.<BODY>

The above text is part of an original document that is scrubbed using the scrubbing application 420. The output scrubbed document includes the following text (shown in block 804):

<BODY>"I spoke to [Ref ID=1321/1 Val=GivenName][Ref ID=1321/1 Val=FamilyName] about the case yesterday. [Ref ID=1321/1 Val=GivenName] (and his daughter [Ref ID=1321/1 Val=DaughterFullName]) were surprised by the announcement.</BODY>

As shown above the PII gets extracted and replaced with references (for example, client identifier reference). FIG. 8 also shows the portion of text seen by various users based on their user access rights. For example, John Wash (an attorney) can see the following (as shown in block 806):

"I spoke to Tom Smith about the case yesterday. Tom (and his daughter Maria Smith) were surprised by the announcement."

Hilda Higgins (attorney) who receives the document from John Wash sees the following (as shown in block 808):

I spoke to ■ about the case yesterday. ■ and his daughter ■ were surprised by the announcement.

The above described example may be implemented by leveraging search services, which scan the various data repositories used by each of the organizations associated with John Wash and Hilda Higgins. For example, a user may sign in using their electronic identity for authentication. Since this electronic identity is tied to (or is the same as) their client identifier, the search retrieves all documents that contain their client identifier. The user may then view all documents that contain references to them. In the event the document they read also contains references to other clients, the personally identifiable information relating to the other clients may be redacted. In some embodiments, the user 102 may not see all these on the display 123 immediately since further workflows may be triggered, which may include dynamically verifying that a given document is allowed by policy (for example, according to a rules provided in a rules database) or law to be released back to the customer, or is not subject to a lawsuit. In other examples, the workflow may include a final manual review of the information retrieved by the personally identifiable information retrieval service. In some embodiments, the system 100 provided herein stores all documents containing a particular client identifier. This facilitates supplying all data associated with a user when it is requested by the user. This also prevents documents that have a particular PII marker from getting that PII from the server 104 if the server 104 does not know of the document's existence thereby preventing malicious users inserting random client identifiers into a document with the hope of trying to gain large scale data access. In some embodiments, a user 102 (for example, a clerk) may work with a client in-person to give them printouts of all documents related to the client with all PII of other clients redacted from the document. In some embodiments, the client may request deletion of PII information of the client in all documents associated with an organization or institution. In such cases, the personally identifiable information protecting system ensures that the rest of the document remains intact while the PII is simply redacted from each document. Further annotation (for example, either at a document template level, or manually by the document author) can determine if the full document is deleted or is simply redacted. Additionally, at the client database level or through an operating system group policy the settings for protecting PII in documents can be pushed into one or more author's application (for example, a word processing application).

Figure 9:
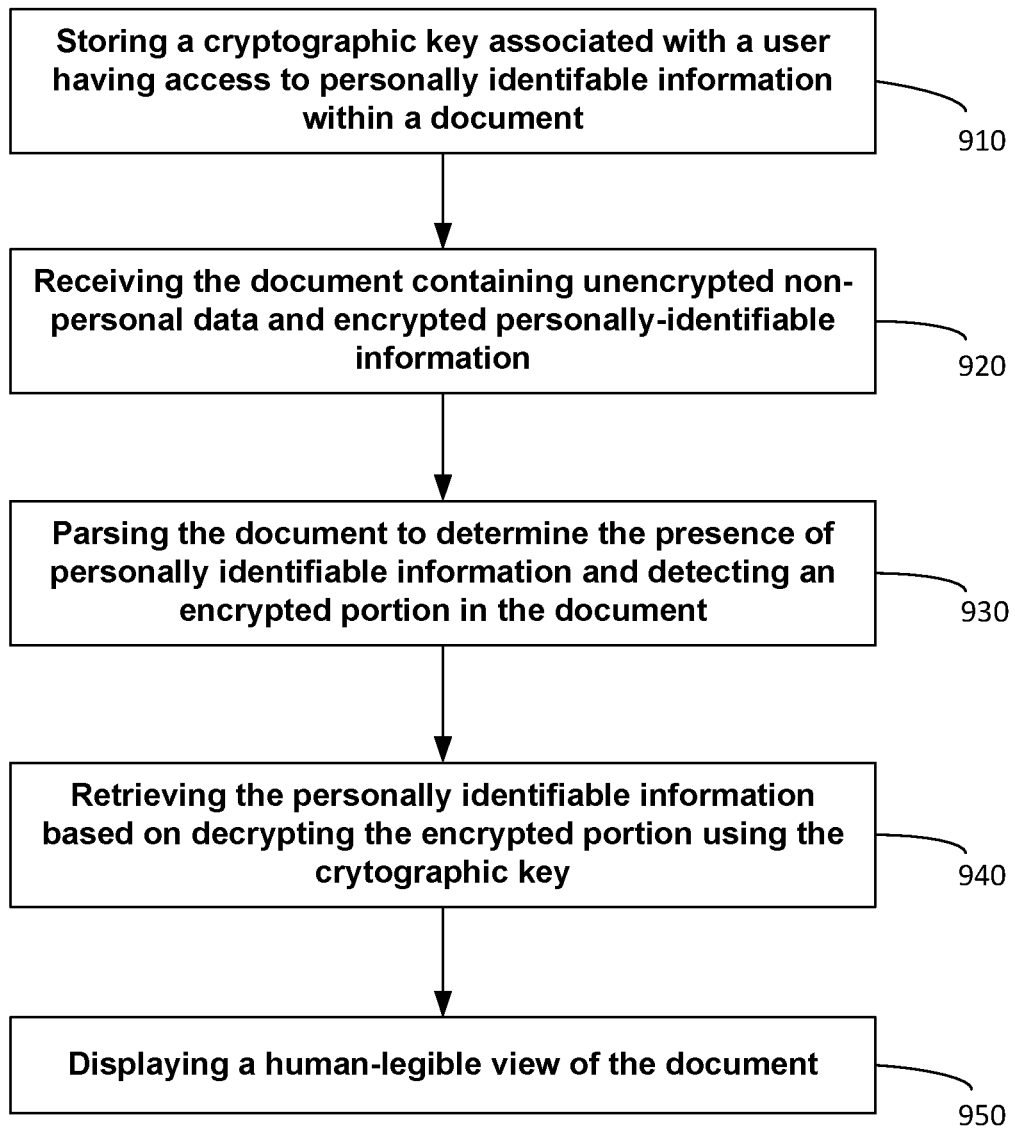
FIG. 9 is a flow chart illustrating a method for protecting personally identifiable information using encryption, in accordance with some embodiments.

FIG. 9 is a flow chart illustrating a method for protecting personally identifiable information using encryption, in accordance with some embodiments. At block 910, the electronic processor 126 is configured to store a cryptographic key associated with a user having access to personally identifiable information within a document. At block 920, the electronic processor 126 is further configured to receive the document containing unencrypted non-personally identifiable information and encrypted personally identifiable information. At block 930, the electronic processor 126 is further configured to parse the document to determine the presence of personally identifiable information and detect an encrypted portion within the document. At block 940, the electronic processor 126 is further configured to retrieve the personally identifiable information based on decrypting the encrypted portion using the cryptographic key. At block 950, the electronic processor 126 is configured to display a human-legible view of the document.

The embodiments described and illustrated in the above description and accompanying drawings are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component.

In the embodiments provided, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between entities or actions.

Various features and advantages of some embodiments are set forth in the following claims.

What is claimed is:

1. A computer system for protecting information associated with a plurality of entities, the computer system comprising:
an electronic processor configured to
store records in a client database, each of the records including personally identifiable information associated with at least one of the plurality of entities and a client identifier reference associated with at least one of the plurality of entities, the personally identifiable information accessible based on an authorization level associated with a user;
receive a document containing both non-personal data and personally identifiable information;
parse the document to determine the presence of personally identifiable information in the document;
determine, based on the records stored in the client database, one of the plurality of entities associated with the personally identifiable information included in the document;
substitute the personally identifiable information included in the document with the client identifier reference stored in the client database corresponding to the one of the plurality of entities;
generate a human-legible view of the document containing the client identifier reference corresponding to the one of the plurality of entities;

in response to a first personally identifiable information matching only one record in the client database, removing the first personally identifiable information from the document and replacing the first personally identifiable information with a first client identifier reference;

in response to the first personally identifiable information matching more than one record in the client database, provide a selection of matched records from the client database; and in response to the first personally identifiable information matching none of the records in the client database, updating the client database with a new record and generating a new client identifier reference associated with the first personally identifiable information.

2. The computer system of claim 1, wherein each of the plurality of entities is an item selected from the group consisting of an individual, a group, an organization and a content.

3. The computer system of claim 1, wherein the document includes personally identifiable information included in an item selected from the group consisting of textual data, audio data, image data, and video data.

4. The computer system of claim 1, wherein the electronic processor is further configured to
generate the human-legible view of the document having portions of the document redacted based on the access rights to the personally identifiable information of entities included in the document.

5. The computer system of claim 1, wherein the client identifier reference includes information associated with the client database.

6. The computer system of claim 1, wherein the electronic processor is further configured to:
in response to a first personally identifiable information matching only one record in the client database, remove the first personally identifiable information from the document and replace the first personally identifiable information with a first client identifier reference.

7. The computer system of claim 1, wherein the electronic processor is further configured to
in response to a first personally identifiable information matching more than one record in the client database, provide a selection of matched records from the client database.

8. The computer system of claim 1, wherein the electronic processor is further configured to
in response to a first personally identifiable information matching none of the records in the client database, update the client database with a new record and generate a new client identifier reference associated with the first personally identifiable information.

9. The computer system of claim 1, wherein the electronic processor is further configured to
determine that a first personally identifiable information is associated with an entity that does not have a record in the client database; and
add a new record associated with the personally identifiable information.

10. The computer system of claim 1, wherein the personally identifiable information includes an item selected from the group consisting of name, date of birth, place of birth, email address, phone number, fax number, particular content, social networking credential, biometric information, financial account number, organization issued identification, and government issued identification.

11. The computer system of claim 1, wherein the client database is accessible based on an authorization level associated with the user.

12. The computer system of claim 1, wherein the client identifier reference includes a plurality of segments, the plurality of segments having a first segment associated with an individual and a second segment associated with an organization.

13. The computer system of claim 1, wherein the electronic processor is further configured to
retrieve a plurality of documents including personally identifiable information associated with an entity.

14. The computer system of claim 13, wherein the electronic processor is further configured to redact personally identifiable information included in at least one of the plurality of documents and not associated with the entity.

15. The computer system of claim 1, wherein the electronic processor is further configured to
delete all documents containing personally identifiable information associated with an individual.

16. A method for protecting personally identifiable information of entities, the method comprising:
storing records in a client database, the records including personally identifiable information associated with entities and a client identifier reference associated with each of the entities, the personally identifiable information accessible based on an authorization level associated with a user;
receiving a document containing both non-personal data and personally identifiable information of one or more entities, the personally identifiable information of the one or more entities including at least one selected from the group consisting of audio data and image data;
parsing the document to determine the presence of personally identifiable information included in the document;
determining, based on the records stored in the client database, one of the entities associated with the personally identifiable information included in the document;
substituting the personally identifiable information included in the document with a client identifier reference stored in the client database corresponding to the one of the entities;
generating a human-legible view of the document containing the client identifier reference;
in response to a first personally identifiable information matching only one record in the client database, removing the first personally identifiable information from the document and replacing the first personally identifiable information with a first client identifier reference;
in response to the first personally identifiable information matching more than one record in the client database, provide a selection of matched records from the client database; and
in response to the first personally identifiable information matching none of the records in the client database, updating the client database with a new record and generating a new client identifier reference associated with the first personally identifiable information.

17. The method of claim 16, further comprising:
retrieve all documents containing personally identifiable information associated with an individual; and
delete all documents containing personally identifiable information associated with the individual.

18. A non-transitory computer-readable medium containing instructions that when executed by one or more electronic processors cause the one or more electronic processors to:
- store records in a client database, each of the records including personally identifiable information associated with at least one of a plurality of individuals and a client identifier reference associated with at least one of the plurality of individuals, the personally identifiable information accessible based on an authorization level associated with a user;
- receive a document containing both non-personal data and personally identifiable information;
- parse the document to determine the presence of personally identifiable information in the document;
- determining, based on the records stored in the client database, one of the plurality of individuals associated with the personally identifiable information included in the document;
- substitute the personally identifiable information included in the document with the client identifier reference stored in the client database corresponding to the one of the plurality of individuals;
- generate a human-legible view of the document containing the client identifier reference corresponding to the one of the plurality of individuals;
- in response to a first personally identifiable information matching only one record in the client database, removing the first personally identifiable information from the document and replacing the first personally identifiable information with a first client identifier reference;
- in response to the first personally identifiable information matching more than one record in the client database, provide a selection of matched records from the client database; and
- in response to the first personally identifiable information matching none of the records in the client database, updating the client database with a new record and generating a new client identifier reference associated with the first personally identifiable information.

19. A computer system for protecting information associated with entities, the computer system comprising:
an electronic processor configured to
- store a record in a client database, the record including personally identifiable information associated with an entity and a client identifier reference associated with the entity, the personally identifiable information accessible based on an authorization level associated with a user;
- receive a document containing both non-personal data and personally identifiable information;
- parse the document to determine the presence personally identifiable information in the document;
- determine, based on the record stored in the client database, the entity associated with the personally identifiable information included in the document;
- substitute the personally identifiable information included in the document with the client identifier reference stored in the client database corresponding to the entity;
- generate a human-legible view of the document containing the client identifier reference corresponding to the entity;
- in response to a first personally identifiable information matching only one record in the client database, removing the first personally identifiable information from the document and replacing the first personally identifiable information with a first client identifier reference;
- in response to the first personally identifiable information matching more than one record in the client database, provide a selection of matched records from the client database; and
- in response to the first personally identifiable information matching none of the records in the client database, updating the client database with a new record and generating a new client identifier reference associated with the first personally identifiable information.

* * * * *